United States Patent

Tabata et al.

[11] Patent Number: 5,853,679
[45] Date of Patent: Dec. 29, 1998

[54] REMOVAL OF NITROGEN OXIDE FROM EXHAUST GAS

[75] Inventors: Mitsunori Tabata; Masaaki Kawatsuki; Katsumi Miyamoto, all of Saitama; Hiroshi Tsuchida, Kanagawa; Tomohiro Yoshinari, Saitama; Kazushi Usui, Chiba; Fujio Suganuma, Saitama; Tadao Nakatsuji, Osaka; Hiromitsu Shimizu, Osaka; Ritsu Yasukawa, Osaka; Hideaki Hamada, Ibaraki; Takehiko Ito, Ibaraki; Yoshiaki Kintaichi, Ibaraki; Motoi Sasaki, Ibaraki, all of Japan

[73] Assignees: Japan as Represented by Director General of Agency of Industrial Science and Technology; Petroleum Energy Center; Cosmo Oil Co., Ltd., all of Tokyo; Sakai Chemical Industry Co., Ltd., Osaka, all of Japan

[21] Appl. No.: 733,697

[22] Filed: Oct. 17, 1996

Related U.S. Application Data

[63] Continuation of Ser. No. 420,907, Apr. 12, 1995, abandoned, which is a continuation of Ser. No. 174,339, Dec. 28, 1993, abandoned.

[30] Foreign Application Priority Data

| Aug. 5, 1993 | [JP] | Japan | 5-213336 |
| Nov. 11, 1993 | [JP] | Japan | 5-305976 |
| Dec. 17, 1993 | [JP] | Japan | 5-344274 |
| Dec. 28, 1993 | [JP] | Japan | 4-361389 |

[51] Int. Cl.$^6$ ........................................ B01J 8/02
[52] U.S. Cl. ................................ 423/213.2; 423/239.1
[58] Field of Search .......................... 423/239.1, 213.2

[56] References Cited

U.S. PATENT DOCUMENTS

| 4,529,718 | 7/1985 | Dupin ................................ 502/439 |
| 4,771,029 | 9/1988 | Pereira et al. ...................... 502/355 |
| 4,908,192 | 3/1990 | Harrison et al. .................. 423/213.2 |
| 5,336,476 | 8/1994 | Kintaichi et al. ................. 423/239.1 |

FOREIGN PATENT DOCUMENTS

| 5-220349 | 8/1993 | Japan ........................ B01D 53/36 |

*Primary Examiner*—Gary P. Straub
*Assistant Examiner*—Thomas G. Dunn, Jr.
*Attorney, Agent, or Firm*—Sughrue, Mion, Zinn, Macpeak & Seas, PLLC

[57] ABSTRACT

A process for removing nitrogen oxide from exhaust is disclosed, comprising contacting exhaust containing nitrogen oxide with an alumina catalyst which contains not more than 0.5% by weight of an alkali metal and/or an alkaline earth metal and has a total pore volume of from 0.48 to 1.2 $cm^3 \cdot g^{-1}$ with 0.26 to 0.6 $cm^3 \cdot g^{-1}$ of the total pore volume being formed of pores of not greater than 80 Å or has a volume of pores formed of pores of not greater than 60 Å of from 0.06 to 0.2 $cm^3 \cdot g^{-1}$ and which may have supported thereon tin in an oxidative atmosphere containing excess oxygen in the presence of a hydrocarbon or an oxygen-containing organic compound.

8 Claims, No Drawings

REMOVAL OF NITROGEN OXIDE FROM EXHAUST GAS

This is a Continuation of application Ser. No. 08/420,907 filed Apr. 12, 1995 now abandoned which is a Continuation of application Ser. No. 08/174,339 filed Dec. 28, 1993 now abandoned.

FIELD OF THE INVENTION

This invention relates to a process for removing nitrogen oxide compounds from an exhaust a comprising contacting the gas (often simply referred to as "exhaust" herein) exhaust with a specific alumina catalyst in an oxidative atmosphere containing excess oxygen in the presence of a hydrocarbon or an oxygen-containing organic compound which is externally added in a small amount or is remaining in the exhaust.

BACKGROUND OF THE INVENTION

Because nitrogen oxide compounds (hereinafter inclusively referred to as $NO_x$) in various types of exhaust is not only harmful to the health but causative of photochemical smog and acid rain, development of an effective means for removal of $NO_x$ has been keenly demanded.

Some processes for reducing $NO_x$ from exhaust by use of a catalyst which have hitherto been proposed and put to practical use include (a) a ternary catalyst process in gasoline-driven automobiles, (b) a selective catalytic reduction process using ammonia for exhaust from large-scale exhaust systems, e.g., a boiler, and (c) a process of using a hydrocarbon which comprises contacting a $NO_x$-containing gas with a metal oxide, e.g., alumina, having supported thereon a metal, e.g., copper, as a catalyst in the presence of a hydrocarbon (see JP-A-63-100919, the term "JP-A" as used herein means an "unexamined published Japanese patent application").

Process (a) consists of converting a hydrocarbon component and carbon monoxide present in the automobile combustion gas into water and carbon dioxide in the presence of a catalyst and, at the same time, reducing $NO_x$ to nitrogen. It is necessary to control combustion so that the amount of oxygen present in $NO_x$ may be chemically equivalent to that required for oxidation of the hydrocarbon component and carbon monoxide. Therefore, the process is principally inapplicable to those systems in which excess oxygen exists, such as a diesel engine.

Process (b) involves use of ammonia which is very harmful and, in many cases, should be handled as a high-pressure gas. The process should be carried out with care in handling ammonia and requires a huge device. Therefore, application to a small-sized exhaust gas source, especially a moving one, not only meets great technical difficulties but is uneconomical.

Process (c) has been developed chiefly for gasoline-driven automobiles and is difficult to apply to a diesel engine system. Besides, the catalyst activity attained is insufficient. In some detail, the catalyst used in process (c), which contains a metallic component, such as copper, is poisoned by sulfur oxide compounds (hereinafter inclusively referred to as $SO_x$) from a diesel engine and also suffers from reduction in activity due to, for example, agglomeration of the added metal. The process is thus unsuitable for removal of $NO_x$ of the exhaust gas from a diesel engine.

In particular, a zeolite-based catalyst, though relatively high in initial activity, is disadvantageous where exhaust to be treated contains steam because the water content covers the active sites of the catalyst to cause a reduction in $NO_x$ removing performance. Further, when used under a wet heat condition as in exhaust from a combustion engine, the zeolite catalyst undergoes release of aluminum from the zeolite skeleton, resulting in a fatal reduction of catalytic activity.

It has therefore been demanded to develop a catalyst for reducing $NO_x$ which exhibits high reducing activity and improved durability even when used in an oxygen-excess exhaust gas containing steam or $SO_x$.

SUMMARY OF THE INVENTION

An object of the present invention is to provide a process for efficiently removing $NO_x$ from a broader range of exhaust gases, such as an oxidative exhaust gas and an exhaust gas containing $SO_x$ or steam from various systems including a diesel engine.

As a result of extensive investigations, the present inventors have found a specific alumina catalyst or a specific tin-containing alumina catalyst with which $NO_x$ in exhaust can be efficiently reduced and removed therefrom in the presence of an excess of oxygen even in the presence of steam or $SO_x$.

The present invention relates to a process for removing $NO_x$ from exhaust, comprising contacting an $NO_x$-containing exhaust gas with an alumina catalyst containing not more than 0.5% by weight of an alkali metal and/or an alkaline earth metal and having a total pore volume of from 0.48 to 1.2 $cm^3 \cdot g^{-1}$ with 0.26 to 0.6 $cm^3 \cdot g^{-1}$ of the total pore volume being formed of pores of not greater than 80 Å or an alumina catalyst satisfying the above requirements and further containing tin in an oxidative atmosphere containing excess oxygen in the presence of a hydrocarbon or an oxygen-containing organic compound.

The present invention also relates to a process for removing $NO_x$ from exhaust, comprising contacting an $NO_x$-containing exhaust gas with an alumina catalyst containing not more than 0.5% by weight of an alkali metal and/or an alkaline earth metal and having a pore volume of pores of not greater than 60 Å of from 0.06 to 0.2 $cm^3 \cdot g^{-1}$ and a pore volume of pores of not greater than 80 Å of not less than 0.1 $cm^3 \cdot g^{-1}$ and less than 0.26 $cm^3 \cdot g^{-1}$ or an alumina catalyst satisfying the above requirements and further containing tin in an oxidative atmosphere containing excess oxygen in the presence of a hydrocarbon or an oxygen-containing organic compound.

DETAILED DESCRIPTION OF THE INVENTION

The catalyst which can be used in the present invention includes an alumina catalyst which contains not more than 0.5% by weight of an alkali metal and/or an alkaline earth metal (hereinafter referred to as requirement I) and has a total pore volume of from 0.48 to 1.2 $cm^3 \cdot g^{-1}$ with 0.26 to 0.6 $cm^3 \cdot g^{-1}$ of the total pore volume being formed of pores of not greater than 80 Å (hereinafter referred to as requirement II), an alumina catalyst which satisfies requirements I and II and, in addition, has a specific mean pore size, an alumina catalyst which satisfies requirements I and II and also contains tin, an alumina catalyst which satisfies requirement I and has a pore volume of pores of not greater than 60 Å of from 0.06 to 0.2 $cm^3 \cdot g^{-1}$ and a pore volume of pores of not greater than 80 Å of not less than 0.1 $cm^3 \cdot g^{-1}$ and less than 0.26 $cm^3 \cdot g^{-1}$ (hereinafter referred to as requirement III), and an alumina catalyst which satisfies requirements I and III and further contains tin.

The basic reaction involved in the process of the present invention seems to be accounted for by reaction formula (I), taking for instance propane ($C_3H_8$) as a hydrocarbon or an oxygen-containing organic compound and nitrogen dioxide ($NO_2$) as $NO_x$:

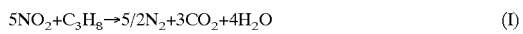

$$5NO_2 + C_3H_8 \rightarrow 5/2N_2 + 3CO_2 + 4H_2O \quad (I)$$

Achievement of reduction of $NO_2$ down to $N_2$ requires oxidation of $C_3H_8$ into $CO_2$ and $H_2O$. Unless oxidation of $C_3H_8$ proceeds, reduction of $NO_2$ does not proceed either. However, if oxidation of $C_3H_8$ proceeds excessively, $C_3H_8$ no more participates in the above reaction of formula (I), resulting in a the reduction in reduction rate of $NO_2$.

Accordingly, in order to reduce $NO_x$ at a high rate, oxidation of a hydrocarbon or an oxygen-containing organic compound serving as a reducing agent for $NO_x$, e.g., $C_3H_8$ in the above case (hereinafter sometimes referred to as a reducing agent), must be moderate.

In the present invention, a specific alumina catalyst is used for the purpose of accelerating the above-mentioned moderate oxidation of a reducing agent.

In using an alumina catalyst, cases are sometimes met in which the $NO_x$ reduction removal efficiency (i.e., the rate of $NO_x$ removed per the reducing agent consumed by oxidation) largely varies with the degree of oxidation of the reducing agent being equal. The inventors have studied the cause of the variation of $NO_x$ removal efficiency and found that the $NO_x$ reduction removal efficiency is related to impurities in the alumina catalyst used, and in particular, alkali metals or alkaline earth metals have great influences on the $NO_x$ reduction removal efficiency.

Hence the alumina catalyst according to the present invention should satisfy requirement I, that is, it should not contain more than 0.5% by weight, and preferably more than 0.1% by weight, of an alkali metal and/or an alkaline earth metal.

The lower limit of alkali metals and/or alkaline earth metals is not specified. The lower, the better. By virtue of the latest advancements of techniques for metal removal and for metal content measurement, the content of alkali metals and alkaline earth metals may be reduced to nearly zero.

Similarly to alkali metals or alkaline earth metals, the sulfur content of an alumina catalyst is preferably reduced as low as possible, e.g., not more than about 0.1% by weight, for increasing the $NO_x$ reduction removal efficiency. A nearly zero sulfur content is desirable.

In cases where the content of alkali metals and/or alkaline earth metals is approximately 0 and, in addition, the sulfur content is also approximately 0, the alumina catalyst may be composed of 100% $Al_2O_3$, except for a water content.

For the purpose of accelerating moderate oxidation of the reducing agent and obtaining a high $NO_x$ reduction removal efficiency at a lower temperature and at a higher space velocity, porosity of the alumina catalyst is of importance. That is, the pore volume attributed to pores having a pore size of not greater than about 80 Å should be specified by requirement II. As the pore volume of pores of not greater than 80 Å becomes larger, more specifically larger than about 0.26 $cm^3 \cdot g^{-1}$, preferably larger than 0.32 $cm^3 \cdot g^{-1}$, and more preferably larger than 0.35 $cm^3 \cdot g^{-1}$, moderate oxidation of the reducing agent can be accelerated.

If the pore volume of pores of not greater than 80 Å is less than about 0.26 $cm^3 \cdot g^{-1}$ and also if the pore volume of pores of not greater than 60 Å is less than 0.06 $cm^3 \cdot g^{-1}$ (i.e., unless requirement III is fully satisfied), oxidation of the reducing agent is suppressed more than necessary so that reaction (I) does not proceed satisfactorily, resulting in no improvement in $NO_x$ reduction removal efficiency at a low temperature and at a high space velocity.

While the upper limit of the pore volume of pores not greater than about 80 Å in requirement II is not particularly restricted, a porous alumina catalyst having an excessively large pore volume is difficult to produce and involves too high a cost for practical use. Further, it is a matter of course that the alumina catalyst to be used in the present invention preferably has as large a surface area as possible. From this viewpoint, too, the above-mentioned upper limit is preferably about 0.6 $cm^3 \cdot g^{-1}$, and more preferably about 0.4 $cm^3 \cdot g^{-1}$.

Additionally, in order to facilitate satisfactory diffusion of the reactive gases (e.g., an $NO_x$-containing exhaust gas and a gaseous reducing agent), the total pore volume of the alumina catalyst should be large to some extent. A number of experiments have revealed that the total pore volume should be at least about 0.48 $cm^3 \cdot g^{-1}$, preferably at least about 0.52 $cm^3 \cdot g^{-1}$, and more preferably at least about 0.54 $cm^3 \cdot g^{-1}$. If the total pore volume is less than about 0.48 $cm^3 \cdot g^{-1}$, diffusion of the reactive gases is insufficient for inducing reaction (I) uniformly and with high reaction efficiency.

While the upper limit of the total pore volume is not particularly restricted, an alumina catalyst with too large a total pore volume has such a reduced mechanical strength it tends to be disintegrated in the early stage in actual use and also meets technical difficulty in production. In this connection, a preferred upper limit is about 1.2 $cm^3 \cdot g^{-1}$, and particularly about 0.7 $cm^3 \cdot g^{-1}$.

While the alumina catalyst satisfying requirements I and II will sufficiently accomplish the object of the present invention, a mean pore size is a very important factor in addition to requirements I and II for further acceleration of the above-described moderate oxidation of a reducing agent to thereby improve an $NO_x$ reduction removal efficiency at a lower temperature and at a higher space velocity. That is, of the alumina catalysts satisfying requirements I and II, those having a mean pore size of from about 50 Å to about 70Å, preferably from about 50 to 68Å, and more preferably from about 50 to 65Å, are preferred for acceleration of moderate oxidation of a reducing agent. Those having a mean pore size of larger than about 70 Å tend to have insufficient effects, and those having a mean pore size of smaller than about 50 Å are difficult to produce, incur high cost for practical use, and find difficulty in contacting with exhaust.

The pore volume and a mean pore size of an alumina catalyst can be measured as follows. A surface area of an alumina catalyst is first obtained from the nitrogen adsorption isotherm according to a BET method. On the other hand, a nitrogen adsorption and desorption isotherm (at $-196°$ C.) up to a relative pressure of 0.967 is prepared, and a distribution of pores having a radius of not greater than 200 Å is obtained from the isotherm according to a BJH method or a D-H method. From these results are calculated the pore volume as specified in requirement II and the mean pore size. The mean pore size as referred to herein is a representative size value which divides the pore volume into a part of pores greater than that size and an equal part of pores smaller than that size, i.e., a median size of a pore volume vs. pore diameter distribution curve.

The physical properties of the alumina catalyst according to the present invention are those measured on alumina which has been calcined at $600°$ C. in air for 3 hours.

The surface area of the alumina catalyst can be expressed approximately by the following equation, assuming the shape of pores to be a cylinder:

$$\text{Surface Area} = 4000 \times \frac{PV\,(\text{cm}^3 \cdot \text{g}^{-1})}{MPD\,(\text{nm})}$$

wherein PV is a pore volume; and MPD is an mean pore diameter.

Considering physical properties, alumina having high activity on $NO_x$ reduction should have a large pore volume of pores not greater than about 80 Å and a large total pore volume and preferably has a mean pore size of from about 50 to 70 Å as stated above. These characteristics are represented by a P value, a factor for evaluating activity as defined below, ranging from about $1.7 \times 10^{-3}$ to $1.4 \times 10^{-2}$.

$$P = \frac{MPD(nm)/(4000 \times \text{total pore volume}}{(\text{cm}^3 \cdot \text{g}^{-1}) \times \text{volume of pores of not greater than 80 Å }(\text{cm}^3 \cdot \text{g}^{-1}))}$$

While the foregoing description with respect to porosity of the alumina catalyst according to the present invention is concerned with requirement II specifying the volume of pores having a pore size of not higher than 80Å, the inventors have further ascertained that the volume of smaller pores, more specifically not greater than about 60Å, also has an influence on the rate of oxidation of the reducing agent.

That is, moderate oxidation of the reducing agent is accelerated satisfactorily where the pore volume formed of pores having a pore size of not greater than about 60 Å is not less than 0.06 $\text{cm}^3 \cdot \text{g}^{-1}$, preferably not less than 0.08 $\text{cm}^3 \cdot \text{g}^{-1}$, and more preferably not less than 0.10 $\text{cm}^3 \cdot \text{g}^{-1}$, and the pore volume formed of pores having a pore size of not greater than about 80 Å is not less than 0.1 $\text{cm}^3 \cdot \text{g}^{-1}$, preferably not less than 0.15 $\text{cm}^3 \cdot \text{g}^{-1}$, and more preferably not less than 0.2 $\text{cm}^3 \cdot \text{g}^{-1}$ (requirement III).

Note that the volume of pores of not greater than 60 Å does not need to be limited as long as the volume of pores of not greater than 80 Å is at least 0.26 $\text{cm}^3 \cdot \text{g}^{-1}$ as specified by requirement II. When the volume of pores of not greater than 80 Å is less than 0.26 $\text{cm}^3 \cdot \text{g}^-$, the porosity as regards pores of not greater than 60 Å has great influences on the reaction characteristics, especially the oxidation behavior of the reducing agent.

While the upper limit of the volume of pores not greater than 60 Å in requirement III is not particularly restricted, a porous alumina catalyst having an excessively large volume of fine pores of not greater than 60 Å is difficult to produce and involves too high a cost for practical use. Moreover, a porous alumina catalyst with an increased volume of such fine pores tends to undergo sintering which induces changes in properties of the catalyst carrier, leading to a reduction in surface area. Further, it is a matter of course that the alumina catalyst to be used in the present invention preferably has as large a surface area as possible. From this viewpoint, too, the above-mentioned upper limit, while not limiting, is preferably about 0.2 $\text{cm}^3 \cdot \text{g}^{-1}$. For the same reasons, the upper limit of the volume of pores of not greater than 80 Å is preferably about 0.6 $\text{cm}^3 \cdot \text{g}^{-1}$, more preferably about 0.4 $\text{cm}^3 \cdot \text{g}^{-1}$, and most preferably about 0.26 $\text{cm}^3 \cdot \text{g}^{-1}$.

The mechanism of action of the above-mentioned pore size distribution on reaction characteristics has not yet been elucidated, but the following assumption can be presented.

In general, a porous solid catalyst has a considerably larger inner surface than its outer surface, and a catalytic reaction proceeds substantially on the inner surface. The reacting molecules diffuse from the outer surface of the catalyst into the pores and travel to the inner surface where active sites are distributed. In relatively large pores incapable of forcing the molecules to flow, the reacting molecules travel while repeating collisions with each other (general molecular diffusion). To the contrary, in sufficiently fine pores, reacting molecules travel mainly through collision with the wall of pores (Knudsen flow).

In the specific alumina catalyst according to the present invention which has many fine pores of 60 Å and 80Å, a relatively large number of reacting molecules travel through Knudsen flow. It seems, as a result, that the number of contacts of the reacting molecules with the catalyst active sites can be increased, thereby accelerating the reaction.

The alumina catalyst satisfying requirements I and II or III can be prepared by various known processes. For example, an aluminum hydrate prepared from an aqueous solution of an aluminum salt is calcined (thermally decomposed) to obtain alumina.

Various alumina hydrates are produced depending on conditions, such as the concentration or pH of the starting aluminum salt aqueous solution, the time of aging, and the temperature of precipitation. For example, in preparing an alumina hydrate precipitate from a sodium aluminate aqueous solution and carbon dioxide, there are obtained boehmite (pseudoboehmite), bayerite, gibbsite, etc., depending on the above-mentioned conditions. Alumina species obtained by calcination of alumina hydrates of low crystallinity, such as pseudoboehmite, are preferred to those obtained from aluminum hydrates of high crystallinity, such as bayerite and gibbsite, because of their larger specific surface area and larger pore volume than those of the latter.

A method for controlling the porosity of the alumina catalyst so as to satisfy requirement II and/or III will be explained below, taking for instance the case of starting with pseudoboehmite (boehmite gel).

Observation of boehmite gel under an electron microscope reveals fibrous or flaky aggregates. There is observed such a relationship between the structure of boehmite gel and the porosity of the resulting alumina that boehmite gel comprising small basic particles provides on calcination fine pores; that comprising large basic particles large pores; that comprising uniform particles a sharp pore size distribution; and that comprising non-uniform particles a broad pore size distribution, respectively. Accordingly, the pore structure of alumina can be controlled by controlling the basic particles of boehmite gel.

For example, as disclosed in JP-A-58-213832, JP-A-58-190823, and U.S. Pat. Nos. 4,562,059 and 4,555,394, a pH of a solution containing boehmite gel is adjusted so as to dissolve and remove crystallites and to allow small crystals to grow without causing growth of large crystals, thus making the particle size uniform. The size of the thus regulated particles may be selected by pH adjustment and aging time adjustment.

It is also possible to obtain alumina having a varied pore volume or varied pore size distribution by controlling the calcining temperature in preparing alumina from an aluminum hydrate.

Other known methods for controlling a pore volume include a method of adding a water-soluble high polymer, e.g., polyethylene glycol, to boehmite gel (see JP-A-52-104498 and JP-A-52-77891) and a method of substituting a part or a most part of water in boehmite sol with an oxygen-containing organic compound, e.g., an alcohol (see JP-A-50-123588). However, many of these conventional methods are unsuitable for controlling the porosity of micropores (not greater than 20 Å) or the first half region of meso-pores (from 20 to 500 Å) which is of importance in the present invention.

The alumina catalyst of the present invention may have any form or structure, such as a powder form, a particulate form, a pellet form, a honeycomb form, etc.

When used as a molded article, the alumina can be mixed with commonly employed additives, such as a binder, e.g., polyvinyl alcohol, and a lubricant, e.g., graphite, waxes, fatty acids, and carbon wax.

In a modified embodiment of the present invention, the above-mentioned alumina catalyst satisfying requirements I and II or III may contain tin.

As previously stated, the inventors have ascertained that the $NO_x$ reduction activity of alumina is greatly related to the content of alkali metals and/or alkaline earth metals present in alumina as impurities and also to the porosity of alumina. As a result of further study on alumina catalysts having supported thereon tin, they found a correlation between the sequence of $NO_x$ reduction activity originally possessed by an alumina catalyst (carrier) and the sequence of activity of the tin-containing alumina catalyst. That is, the higher the $NO_x$ reduction activity of an alumina carrier, the higher the rate of $NO_x$ reduction achieved by the tin-containing alumina. They have discovered a new fact that the $NO_x$ reducing activity of the tin-containing alumina catalyst is also related to the contents of alkali metals and/or alkaline earth metals in the catalyst and the porosity (pore volume, pore size, etc.) without any exception.

Tin in the tin-containing alumina catalyst acts on the active sites of the alumina serving as a carrier to greatly improve the $NO_x$ reducing activity at a low temperature and the activity in the presence of steam and $SO_x$. Although the mechanism of action of tin on reaction acceleration has not yet been made clear, tin appears to assist the reaction on alumina.

The tin-containing alumina catalyst which can be used in the present invention is a catalyst prepared by incorporating tin into conventionally prepared alumina with a controlled pore volume.

The manner of incorporation of tin into alumina is not particularly limited, and any known technique can be used. For example, an ordinary alumina carrier is impregnated with an aqueous solution of a tin compound and, after drying, calcined in air.

The tin compound to be used includes inorganic tin salts, such as stannic chloride, stannous chloride, stannous sulfate, stannic sulfate, stannous nitrate, and stannic nitrate; and organic tin salts, such as stannous tartrate, stannous acetate, ammonium hexachlorostannate, hexaethylditin, and tetraphenyltin. Stannic chloride is usually used for preference. In order to increase solubility, a tin compound may be used in combination with diluted hydrochloric acid, diluted nitric acid, etc.

A tin content in the tin-containing alumina catalyst is usually from about 0.01 to 30% by weight, and preferably from about 0.1 to 10% by weight, (on a metal conversion) based on alumina. If the tin content is less than about 0.01% by weight, no substantial effect of tin incorporation is produced. If it exceeds about 30% by weight, tin tends to cover the alumina carrier, resulting in a failure of manifestation of the cooperative effect of alumina and tin or resulting in clogging of the pores of alumina.

Air calcination of the tin-impregnated alumina is carried out at a temperature of from about 300° to 800° C., and preferably from about 400° to 600° C., for about 1 to 10 hours.

In addition to the above-mentioned impregnation process, incorporation of tin into alumina may be effected by co-precipitation, kneading, deposition, and the like to obtain a tin-containing alumina-based compound oxide catalyst which is also effective in the present invention.

A co-precipitation process comprises adding an appropriate precipitating agent to a mixed aqueous solution of an aluminum salt and a tin salt to precipitate hydroxide a compound or a carbonate compound, washing the precipitate collected by filtration, drying, and if desired, calcining.

A kneading process comprises mixing and kneading separately prepared gel or slurried hydroxides or carbonates of aluminum and tin in a kneading machine, drying the mixture, and if desired, followed by calcination.

A deposition process comprises immersing a previously prepared gel or slurried hydroxide or carbonate of one of the metals in an aqueous solution of a salt of the other metal, e.g., a nitrate, a sulfate, an acetate or a chloride, adding a precipitating agent to the solution to deposit the metallic component on the gel or slurry, followed by filtration, washing with water, drying and, if desired, calcination.

These processes are often suitable in cases where a large amount of tin is to be incorporated. The amount of tin to be incorporated into alumina according to these processes suitably ranges from about 5 to 30% by weight based on alumina.

The process for incorporating tin into alumina is not particularly limited, and any of the above-mentioned impregnation process, co-precipitation process, kneading process, and deposition process may be employed.

The $NO_x$-containing gases to which the present invention is applicable include exhaust from nitric acid manufacturing facilities and various combustion facilities as well as exhaust from diesel engines, such as diesel automobiles and stationary diesel engines, and gasoline engines, such as gasoline-driven automobiles.

Removal of $NO_x$ from these exhaust gases can be carried out by bringing the gas into contact with the above-described catalyst in an oxidative atmosphere containing excess oxygen in the presence of a hydrocarbon or an oxygen-containing organic compound.

The terminology "oxidative atmosphere" as used herein means an atmosphere containing oxygen in excess over the theoretical amount necessary for completely oxidizing carbon monoxide, hydrogen, and hydrocarbons or oxygen-containing organic compounds which are present in exhaust and a hydrocarbon or oxygen-containing organic compound (reducing agent) which may be added, if necessary, to the exhaust into water and carbon dioxide. For example, exhaust from internal combustion engines, such as automobiles, is an atmosphere of a lean region with a large air ratio and usually has an oxygen excess ratio of from about 20 to 200%.

In the oxidative atmosphere, the catalyst of the present invention catalyzes the reaction between a hydrocarbon or an oxygen-containing organic compound and $NO_x$ as illustrated by formula (I) preferentially over an oxidation reaction between a hydrocarbon or an oxygen-containing organic compound and oxygen thereby to remove $NO_x$.

The hydrocarbons or oxygen-containing organic compounds which should exist in the reaction system as a reducing agent for reduction of $NO_x$ may be those remaining in exhaust or suspended particulate matter (hereinafter abbreviated as SPM) which are products of imperfect combustion of fuels, etc. Where the hydrocarbons or oxygen-containing organic compounds present in exhaust are insufficient for acceleration of reaction (I), it is necessary to externally supply a hydrocarbon or oxygen-containing organic compound.

The amount of the hydrocarbons or oxygen-containing organic compounds present in the reaction system is not particularly limited. For example, the amount may be less than a theoretical amount necessary for reduction of $NO_x$ in cases where a demanded rate of $NO_x$ removal is low. However, it is generally preferable that the reducing agent should exist in excess because the reduction reaction is more progressive in the presence of a reducing agent in excess over the theoretical amount. To this effect, the reducing agent is generally used in about 20 to 2,000% excess, and preferably about 30 to 1,500% excess, over the theoretical amount.

The terminology "theoretical amount" as used herein with respect to a hydrocarbon or an oxygen-containing organic compound is defined to be a theoretical amount of a hydrocarbon or an oxygen-containing organic compound which is required for reductively decomposing nitrogen dioxide ($NO_2$) because the reaction system contains oxygen. For example, in the case of using propane as a hydrocarbon, the theoretical amount of propane necessary for reductively decomposing 1,000 ppm of nitrogen monoxide (NO) in the presence of oxygen is 200 ppm. In general, the hydrocarbon or oxygen-containing organic compound should be present in the reaction system in an amount of from about 50 to 10,000 ppm on a methane conversion, though varying depending on the amount of $NO_x$ in exhaust to be treated.

Specific examples of the hydrocarbons which can be used in the present invention include gaseous hydrocarbons, such as methane, ethane, ethylene, propane, propylene, butane, and butylene; and liquid hydrocarbons, such as single hydrocarbons, e.g., pentane, hexane, octane, heptene, benzene, toluene, and xylene, and mineral oils, e.g., gasoline, kerosene, gas oil, and heavy oil.

Specific examples of the oxygen-containing organic compounds which can be used in the present invention include alcohols, e.g., methyl alcohol, ethyl alcohol, propyl alcohol, and octyl alcohol, ethers, e.g., dimethyl ether, ethyl ether, and propyl ether, esters, e.g., methyl acetate, ethyl acetate, and fats and oils, and ketones, e.g., acetone and methyl ethyl ketone.

These hydrocarbons or oxygen-containing organic compounds may be used either individually or in combination of two or more thereof.

Non-combustion or imperfect combustion products of fuels which are present in exhaust (i.e., hydrocarbons or oxygen-containing organic compounds and SPM) are also effective as a reducing agent and are included under the hydrocarbons or oxygen-containing organic compounds according to the present invention. This means that the alumina catalyst of the present invention also functions as a catalyst for reducing or removing the hydrocarbons or oxygen-containing organic compounds and SPM present in exhaust.

The reaction for $NO_x$ removal can be performed by passing an $NO_x$-containing exhaust gas through a reactor in which the specific alumina catalyst of the present invention has been put and which contains a hydrocarbon or an oxygen-containing organic compound.

The reaction temperature is preferably near the temperature of exhaust to be treated because no equipment for heating the exhaust is needed. The optimum reaction temperature is generally in the range of from about 200° to 800° C., and preferably from about 300° to 600° C., while somewhat varying depending on the kind of the alumina catalyst or the kind of the hydrocarbon or oxygen-containing organic compound.

The reaction pressure is not particularly limited, and the reaction proceeds either under pressure or under reduced pressure. In a convenient way, exhaust is fed to a catalyst layer under an ordinary exhaust pressure to effect the reaction.

The space velocity is not particularly limited as is decided by the kind of an alumina catalyst, other reaction conditions, a desired $NO_x$ reduction removal efficiency, and so forth. In general, it ranges from about 500 to 100,000 $hr^{-1}$, and preferably from about 1,000 to 70,000 $hr^{-1}$.

In treating exhaust from an internal combustion engine, the reaction system is preferably placed downstream from an exhaust manifold.

Cases are sometimes met in which the thus treated exhaust contains non-burnt hydrocarbons or oxygen-containing organic compounds or imperfect combustion products, such as carbon monoxide, which cause environmental pollution. Such a problem can be solved by bringing the gas having been treated with the alumina catalyst of the present invention into contact with a catalyst for oxidation in an oxidative atmosphere.

The catalyst for oxidation which can be used in the present invention is selected from those capable of catalyzing perfect combustion of the above-mentioned imperfect combustion products. Such catalysts are composed of a porous carrier (e.g., active alumina, silica or zirconia) having supported thereon one or more of catalyst components, such as noble metals (e.g., platinum, palladium or ruthenium), an oxide of a base metal (e.g., lanthanum, cerium, copper, iron or molybdenum), and a perovskite structure (e.g., cobalt lanthanum trioxide, iron lanthanum trioxide or cobalt strontium trioxide). The catalyst component is used in an amount of from about 0.01 to 2% by weight in the case of a noble metal and from about 5 to 70% by weight in the case of a base metal oxide, each based on the carrier. Of the above catalyst components, base metal oxides, etc., may be used as they are without being supported on a carrier. With reference to the form of the catalyst for oxidation and additives which may be used for, for example, catalyst molding, those for the catalyst for reduction apply.

The ratio of the catalyst for reduction to the catalyst for oxidation, the proportion of the catalyst component in the catalyst for oxidation, and the like are subject to variation according to the desired performance. In general, a catalyst for reduction (A) and a catalyst for oxidation (B) are used at an (A)/(B) ratio of about 0.5 to 9.5/9.5 to 0.5. A catalyst for reduction is generally placed upstream, and a catalyst for oxidation downstream in the reaction system in such a manner that a reactor containing a catalyst for reduction is placed at the inlet of exhaust (front stage), and a reactor containing a catalyst for oxidation at the outlet (rear stage), or the two catalysts are placed in the same reactor at an appropriate ratio. Where in particular the substance to be removed by oxidation is an intermediate oxidation product of a hydrocarbon or an oxygen-containing organic compound, such as carbon monoxide, it is possible to use a mixture of a catalyst for reduction and a catalyst for oxidation.

The temperature of use of a catalyst for oxidation does not need to be the same as that of a catalyst for reduction, but, in general, it is recommended to choose such a catalyst for oxidation which can be used within a temperature range applicable to the above-described catalyst for reduction so that additional equipment for heating or cooling is unnecessary.

According to the process of the present invention characterized by using a specific alumina catalyst or a specific tin-containing alumina catalyst, $NO_x$ in exhaust can be removed efficiently and, under controlled reaction conditions, virtually completely in an oxidative atmosphere containing excess oxygen.

Further, the present invention makes it possible to minimize reduction of activity of a specific alumina catalyst or a specific tin-containing alumina catalyst even where exhaust contains $SO_x$ or steam. This is because the catalyst of the present invention accelerates moderate oxidation of hydrocarbons or oxygen-containing organic compounds, thereby accelerating a reaction between $NO_x$ and hydrocarbons or oxygen-containing organic compounds preferentially over a reaction between $O_2$ and hydrocarbons or oxygen-containing organic compounds. Thus, the present invention is effective for efficient $NO_x$ removal from exhaust from various facilities inclusive of diesel engines and is therefore of great industrial value.

The present invention will now be illustrated in greater detail with reference to Examples, but the present invention should not be construed as being limited thereto.

Examples 1 to 7 relate to alumina catalysts satisfying requirements I and II, Examples 8 to 13 alumina catalysts satisfying requirements I and III, Examples 14 to 19 tin-containing alumina catalysts satisfying requirements I and II, and Examples 20 to 24 tin-containing alumina catalysts satisfying requirements I and III, respectively.

EXAMPLE 1

Helium gas containing 1,000 ppm of nitrogen monoxide, 10% by volume of oxygen, and 1,000 ppm of propane was made to flow in a normal pressure flow reactor packed with 1 g of an alumina catalyst having characteristics shown in Table 1 below (a commercially available product "Alumina N612N" produced by Nikki Kagaku Co., Ltd.) at a contact time of 0.2 g·s·cm$^3$ and at a varied temperature as shown in Table 1. The resulting reaction gas was analyzed by gas chromatography to determine $N_2$, $N_2O$, CO, $CO_2$, $C_3H_8$, etc., and from the $N_2$ yield was calculated a rate of NO reduction (a conversion of NO to $N_2$). The results obtained are shown in Table 1.

Comparative Example 1

NO removal from an NO-containing helium gas was carried out in the same manner as in Example 1, except for using an alumina catalyst having characteristics shown in Table 1 ("Alumina KHA-46" produced by Sumitomo Chemical Co., Ltd.). The results obtained are shown in Table 1.

Comparative Example 2

An aqueous solution of 0.93 g of sodium nitrate in 35 g of ion-exchanged water was impregnated into 50 g of alumina ("Alumina Neobead GB-45" produced by Mizusawa Kagaku Co., Ltd.). After drying at 100° C. for one day, the impregnated alumina was calcined in air flow at 600° C. for 3 hours to prepare an alumina catalyst containing 0.51% by weight of Na based on alumina.

NO removal from an NO-containing helium gas was carried out in the same manner as in Example 1, except for using the above-prepared alumina catalyst. The results obtained are shown in Table 1.

TABLE 1

|  | Example 1 | Compar. Example 1 | Compar. Example 2 |
|---|---|---|---|
| Alumina Catalyst: |  |  |  |
| Impurities (wt %) | Ca: 0.02 | Na: 0.13 Ca: 0.03 | Na: 0.51 Ca: 0.01 Mg: 0.01 |
| Mean pore size (Å) | 64 | 63 | 65 |
| Volume of pores not greater than 80 Å (cm$^3 \cdot$ g$^{-1}$) | 0.280 | 0.291 | 0.329 |
| Total pore volume (cm$^3 \cdot$ cm$^{-1}$) | 0.491 | 0.472 | 0.544 |
| Surface area (m$^2 \cdot$ g$^{-1}$) | 174 | 160 | 188 |
| Rate of NO Removal (%): Reaction temperature: |  |  |  |
| 400° C. | 17 | 12 | 9.0 |
| 500° C. | 87 | 69 | 39 |
| 600° C. | 66 | 42 | 16 |
| Conversion to $CO_x$ (%): Reaction temperature: |  |  |  |
| 400° C. | 7 | 10 | 16 |
| 500° C. | 70 | 88 | 90 |
| 600° C. | 90 | 97 | 99 |

As is apparent from Table 1, the alumina catalyst of Comparative Example 1 which contains more than 0.1% by weight of an alkali metal or an alkaline earth metal as impurities suffers from a reduction in $NO_x$ removal efficiency. The reduction in $NO_x$ removal efficiency is pronounced in the case of the alumina catalyst of Comparative Example 2 which contains more than 0.5% by weight of such impurities. It is particularly obvious that an alumina catalyst containing an alkali metal, such as Na, suffers from great reduction in activity.

EXAMPLE 2

NO removal from an NO-containing helium gas was carried out in the same manner as in Example 1, except for using an alumina catalyst having characteristics shown in Table 2 below ("Alumina NK-346" produced by Sumitomo Chemical Co., Ltd.). The results obtained are shown in Table 2.

Comparative Example 3

NO removal from an NO-containing helium gas was carried out in the same manner as in Example 2, except for using an alumina catalyst having characteristics shown in Table 2 ("Alumina KHS-46" produced by Sumitomo Chemical Co., Ltd.). The results obtained are shown in Table 2.

TABLE 2

|  | Example 2 | Compar. Example 3 |
|---|---|---|
| Alumina Catalyst: |  |  |
| Impurities (wt %) | Na: 0.04 Ca: 0.02 | Ca: 0.01 |
| Mean pore size (Å) | 58 | 75 |
| Volume of pores not greater than 80 Å (cm$^3 \cdot$ g$^{-1}$) | 0.408 | 0.199 |
| Total pore volume | 0.559 | 0.534 |

TABLE 2-continued

|  | Example 2 | Compar. Example 3 |
|---|---|---|
| (cm$^3$ · cm$^{-1}$) |  |  |
| Surface area (m$^2$ · g$^{-1}$) | 236 | 159 |
| Rate of NO Removal (%): |  |  |
| Reaction temperature: |  |  |
| 400° C. | 19 | 17 |
| 500° C. | 90 | 51 |
| 600° C. | 56 | 50 |
| Conversion to CO (%): |  |  |
| Reaction temperature: |  |  |
| 400° C. | 9.5 | 6.2 |
| 500° C. | 82 | 31 |
| 600° C. | 90 | 80 |

As can be seen from Table 2, the alumina catalyst of Example 2 which has a volume of pores of not greater than 80 Å of 0.408 cm$^3$·g$^{-1}$ and a mean pore size of 58 Å exhibits acceleration of moderate oxidation of propane as aimed in the present invention to achieve a high rate of NO$_x$ reduction removal as compared with the alumina catalyst of Comparative Example 3 having a volume of pores of not greater than 80 Å of 0.199 cm$^3$·g$^{-1}$ and a mean pore size of 75Å.

EXAMPLE 3

NO removal from an NO-containing helium gas was carried out in the same manner as in Example 1, except for using an alumina catalyst having characteristics shown in Table 3 below ("Alumina Neobead GB-45") and changing the contact time to 0.1 g·s·cm$^3$. The results obtained are shown in Table 3.

EXAMPLE 4

NO removal from an NO-containing helium gas was carried out in the same manner as in Example 3, except for using an alumina catalyst having characteristics shown in Table 3 ("Alumina N612N" produced by Nikki Kagaku Co., Ltd.). The results obtained are shown in Table 3.

EXAMPLE 5

Twenty-five milliliters of an aqueous solution containing 1344 g of aluminum sulfate per liter was diluted with 5000 ml of ion-exchanged water. The solution was mixed with 175 ml of an aqueous solution containing 197 g of sodium aluminate per liter. The mixed solution was heated to 90° C. with stirring.

A 134 g/l aluminum sulfate aqueous solution and a 197 g/l sodium aluminate aqueous solution were poured into the mixed solution at a rate of 4.83 ml/min and 3.33 ml/min, respectively, for 120 minutes. A 500 ml portion taken out of the mixture was filtered to collect a gel product, which was then thoroughly washed with ion-exchanged water, dried at 100° C. for one day, and calcined in an air flow at 600° C. for 3 hours to prepare an alumina catalyst having characteristics shown in Table 3.

NO removal from an NO-containing helium gas was carried out in the same manner as in Example 1, except for using the above-prepared alumina catalyst. The results obtained are shown in Table 3.

TABLE 3

|  | Example 3 | Example 4 | Example 5 |
|---|---|---|---|
| Alumina Catalyst: |  |  |  |
| Impurities (wt %) | Mg: 0.01 Ca: 0.01 | Ca: 0.02 | Na: 0.03 |
| Mean pore size (Å) | 65 | 64 | 74 |
| Volume of pores not greater than 80 Å (cm$^3$ · g$^{-1}$) | 0.329 | 0.280 | 0.264 |
| Total pore volume (cm$^3$ · g$^{-1}$) | 0.544 | 0.491 | 0.516 |
| Surface area (m$^2$ · g$^{-1}$) | 188 | 174 | 207 |
| Rate of NO Removal (%): |  |  |  |
| Reaction temperature: |  |  |  |
| 400° C. | 4.7 | 1.4 | 11 |
| 500° C. | 62 | 45 | 78 |
| 600° C. | 51 | 49 | 49 |
| Conversion to CO$_x$ (%): |  |  |  |
| Reaction temperature: |  |  |  |
| 400° C. | 21 | 1.0 | 3.1 |
| 500° C. | 59 | 42 | 67 |
| 600° C. | 82 | 71 | 87 |

It is apparent from the results of Example 3 as compared with Example 4 that the alumina catalyst of Example 3 whose pore volume of pores no greater than 80 Å and total pore volume are greater than those of the catalyst of Example 4 is more excellent than the catalyst of Example 4 in terms of both NO$_x$ reduction removal efficiency and CO$_2$ conversion.

It is also seen from the results of Example 5 that NO$_x$ reduction proceeds with high efficiency at a low temperature in the case where a pore volume of pores no greater than 80 Å is not less than 0.26 cm$^3$·g$^{-1}$, a total pore volume is not less than 0.48 cm$^3$·g$^{-1}$, and a surface area is increased even while a mean pore size is as large as 74Å.

Accordingly these results prove that a volume of pores of not greater than 80 Å and a total pore volume of an alumina catalyst are important factors ruling its NO$_x$ reduction efficiency.

EXAMPLE 6

NO removal from an NO-containing helium gas was carried out in the same manner as in Example 1, except that an alumina catalyst having characteristics shown in Table 4 below ("Alumina Neobead GB-45") was used, propane as a reducing agent was replaced with about 1,000 ppm of methanol, and the helium gas to be treated further contained 7.6% by volume of steam. The results obtained are shown in Table 4.

Comparative Example 4

NO removal from an NO-containing helium gas was carried out in the same manner as in Example 6, except for using an alumina catalyst having characteristics shown in Table 4 ("Alumina SAH-21" produced by Sumitomo Chemical Co., Ltd.). The results obtained are shown in Table 4.

TABLE 4

|  | Example 6 | Compar. Example 4 |
|---|---|---|
| Alumina Catalyst: |  |  |

TABLE 4-continued

|  | Example 6 | Compar. Example 4 |
|---|---|---|
| Impurities (wt %) | Mg: 0.01<br>Ca: 0.01 | Na: 0.04<br>Mg: 1.2<br>Ca: 0.04 |
| Mean pore size (Å) | 65 | 72 |
| Volume of pores not greater than 80 Å ($cm^3 \cdot g^{-1}$) | 0.329 | 0.233 |
| Total pore volume ($cm^3 \cdot g^{-1}$) | 0.544 | 0.472 |
| Surface area ($m^2 \cdot g^{-1}$) | 188 | 164 |
| Rate of NO Removal (%): Reaction temperature: | | |
| 300° C. | 42 | 13 |
| 350° C. | 54 | 17 |
| 400° C. | 46 | 14 |
| 450° C. | 32 | 9.1 |
| Conversion to $CO_x$ (%): Reaction temperature: | | |
| 300° C. | 59 | 39 |
| 350° C. | 84 | 58 |
| 400° C. | 100 | 81 |
| 450° C. | 100 | 100 |

As can be seen from Table 4, even in a reaction system containing methanol as an oxygen-containing organic compound in the presence of steam, the alumina catalyst of Example 6 having a reduced content of alkali metals and/or alkaline earth metals as impurities, a large mean pore size, and a large pore volume makes $NO_x$ be reduced at high efficiency in a temperature range not lower than 400° C. where oxidation of a reducing agent is accelerated while moderately accelerating oxidation of the reducing agent into $CO_2$ and CO (inclusively expressed by $CO_x$) to attain a high rate of $NO_x$ reduction removal as compared with the alumina catalyst of Comparative Example 4.

EXAMPLE 7

Application to Exhaust from Diesel Engine

The catalytic activity of the alumina catalyst prepared in Example 5 was tested in application to actual exhaust from a 4-cycle water-cooled 4-cylindered (connected in series) diesel engine (direct jet system; 2771 cc; manufactured by Isuzu Motors Ltd.) as follows.

The engine was driven under conditions of 1300 rpm and a load of 10 kg·m, and part of the exhaust was led in a separate flow through a SUS-made filter to remove SPM and introduced into a catalyst layer kept at a temperature of 400° C. As a reducing agent, 1000 ppm or 3000 ppm of methanol was used.

The exhaust before and after passing through the catalyst layer was analyzed with time with a general exhaust gas analyzer to determine $NO_x$, CO, $CO_2$, total hydrocarbons (hereinafter abbreviated as THC), $SO_x$, etc., and a rate of NO reduction removal was calculated from the decrease of $NO_x$. The exhaust before contact with the catalyst layer was found to contain about 500 ppm of $NO_x$, about 350 ppm of CO, about 4% of $CO_2$, about 500 ppm of THC, about 80 ppm of $SO_x$, about 16% of $O_2$, and about 6% of $H_2O$, in average. The results obtained are shown in Table 5 below.

TABLE 5

| Elapsed Time (hours) | Reducing Agent (methanol) | |
|---|---|---|
| | 1000 ppm | 3000 ppm |
| 26 | 34 | |
| 99 | 34 | |
| 123 | | 73 |
| 261 | 31 | |
| 265 | | 77 |
| 357 | 30 | |
| 432 | | 77 |
| 502 | 32 | |
| 624 | | 73 |
| 790 | 32 | |
| 865 | | 77 |
| 934 | 31 | |
| 1012 | | 78 |
| 1342 | 31 | |

As is obvious from the results in Table 5, the alumina catalyst according to the present invention is capable of efficiently removing $NO_x$ from actual exhaust from a diesel engine containing about 6% of steam and about 80 ppm of $SO_x$ for as long a period of time as 1300 hours or more without undergoing any substantial reduction in performance.

EXAMPLE 8

Helium gas containing 1,000 ppm of nitrogen monoxide, 10% of oxygen, 1,000 ppm of methanol, and 8% of steam was made to flow in a normal pressure flow reactor packed with 1 g of an alumina catalyst having characteristics shown in Table 6 below ("Alumina N611" manufactured by Nikki Kagaku Co., Ltd.) at a contact time of 0.2 g·s·$cm^{-3}$ and at a varied temperature as shown in Table 6. The resulting reaction gas was analyzed by gas chromatography to determine $N_2$, $N_2O$, CO, $CO_2$, etc., and from the $N_2$ yield was calculated a rate of NO reduction removal (a conversion of NO to $N_2$). The results obtained are shown in Table 6.

TABLE 6

| | Example 8 |
|---|---|
| Alumina Catalyst: | |
| Impurity (wt %) | Ca. 0.02 |
| Volume of pores not greater than 60 Å ($cm^3 \cdot g^{-1}$) | 0.083 |
| Volume of pores not greater than 80 Å ($cm^3 \cdot g^{-1}$) | 0.238 |
| Total pore volume ($cm^3 \cdot g^{-1}$) | 0.488 |
| Surface area ($m^2 \cdot g^{-1}$) | 168 |
| Rate of NO Removal (%): Reaction temperature: | |
| 500° C. | 11 |
| 400° C. | 36 |
| 300° C. | 42 |
| Conversion to $CO_x$ (%): Reaction temperature: | |
| 500° C. | 100 |
| 400° C. | 100 |
| 300° C. | 50 |

As can be seen from Table 6, the alumina catalyst having a very low content of alkali metals and/or alkaline earth metals, a volume of pores not greater than 60 Å ranging from 0.06 to 0.2 $cm^3 \cdot g^{-1}$, and a volume of pores not greater than 80 Å ranging from 0.1 to 0.26 $cm^3 \cdot g^{-1}$ was proved capable of removing $NO_x$ with high efficiency even in an atmosphere containing steam.

Comparative Examples 5 To 9

In 35 g of ion-exchanged water was dissolved each of 0.93 g of sodium nitrate, 0.66 g of potassium nitrate, 1.5 g of calcium nitrate tetrahydrate, 2.7 g of magnesium nitrate hexahydrate, and 0.49 g of barium nitrate. Fifty grams of alumina ("Alumina N611") was impregnated with each of the resulting aqueous solutions, dried at 100° C. for one day, and calcined in an air flow at 600° C. for 3 hours.

The thus prepared alumina catalyst had an Na content of 0.51% by weight, a K content of 0.55% by weight, a Ca content of 0.52% by weight, an Mg content of 0.56% by weight or a Ba content of 0.52% by weight.

NO removal from an NO-containing helium gas was carried out in the same manner as in Example 8, except for using the above-prepared alumina catalyst. The results obtained are shown in Table 7 below.

TABLE 7

|  | Compar. Example 5 | Compar. Example 6 | Compar. Example 7 | Compar. Example 8 | Compar. Example 9 |
|---|---|---|---|---|---|
| Impurities (%) | Na: 0.51 | K: 0.55 | Ca: 0.52 | Mg: 0.56 | Ba: 0.52 |
| Volume of pores not greater than 60 Å ($cm^3 \cdot g^{-1}$) | 0.083 | 0.083 | 0.083 | 0.083 | 0.083 |
| Volume of pores not greater than 80 Å ($cm^3 \cdot g^{-1}$) | 0.238 | 0.238 | 0.238 | 0.238 | 0.238 |
| Total pore volume ($cm^3 \cdot g^{-1}$) | 0.488 | 0.488 | 0.488 | 0.488 | 0.488 |
| Surface area ($m^2 \cdot g^{-1}$) | 168 | 168 | 168 | 168 | 168 |
| Rate of NO Removal (%): |  |  |  |  |  |
| Reaction Temperature: |  |  |  |  |  |
| 500° C. | 1.7 | 2.9 | 1.7 | 7.4 | 4.7 |
| 450° C. | 3.4 | 4.9 | 4.8 | 14 | 10 |
| 400° C. | 5.8 | 7.4 | 10 | 25 | 18 |
| 350° C. | 7.9 | 9.5 | 18 | 38 | 29 |
| 300° C. | 7.6 | 9.6 | 22 | 37 | 40 |

Table 7 reveals that alumina catalysts containing 0.5% by weight or more of an alkali metal and/or an alkaline earth metal suffer from a marked reduction in NO reduction removal efficiency as compared with the alumina catalyst of Example 8 which contains substantially no impurity. The degree of reduction in activity is especially conspicuous with alumina catalysts containing an alkali metal, e.g., Na or K.

EXAMPLES 9 TO 11

Twenty-five milliliters of a 1344 g/l aqueous solution of aluminum sulfate was diluted with 3000 ml of ion-exchanged water. The solution was mixed with 175 ml of a 197 g/l aqueous solution of sodium aluminate, and the mixed solution was heated to 90° C. with stirring.

A 134 g/l aluminum sulfate aqueous solution and a 197 g/l sodium aluminate aqueous solution were poured into the mixed solution at a rate of 4.83 ml/min and 3.33 ml/min, respectively. A 500 ml portion of the mixture was withdrawn after 120 minutes, 240 minutes, and 270 minutes from the start of pouring and filtered to collect a gel product, which was then thoroughly washed with ion-exchanged water, dried at 100° C. for one day, and calcined in an air flow at 600° C. for 3hours to prepare an alumina catalyst.

NO removal from an NO-containing helium gas was carried out in the same manner as in Example 8, except for using the above-prepared alumina catalyst, replacing methanol as a reducing agent with propane (1,000 ppm), and excluding steam from the helium gas. The results obtained are shown in Table 8 together with the characteristics of the alumina catalyst used.

TABLE 8

|  | Example 9 | Example 10 | Example 11 |
|---|---|---|---|
| Alumina Catalyst: |  |  |  |
| Impurities (wt %) | Na: 0.03 | Na: 0.04 | Na: 0.04 |
| Volume of pores not greater than 60 Å ($cm^3 \cdot g^{-1}$) | 0.074 | 0.103 | 0.109 |
| Volume of pores not greater than 80 Å ($cm^3 \cdot g^{-1}$) | 0.132 | 0.133 | 0.139 |
| Total pore volume ($cm^3 \cdot g^{-1}$) | 0.516 | 0.416 | 0.393 |
| Surface area ($m^2 \cdot g^{-1}$) | 207 | 193 | 187 |
| Rate of NO Removal (%): |  |  |  |
| Reaction temperature: |  |  |  |
| 400° C. | 10 | 13 | 15 |
| 500° C. | 74 | 81 | 83 |
| 600° C. | 50 | 48 | 46 |
| Conversion to $CO_x$ (%): |  |  |  |
| Reaction temperature: |  |  |  |
| 400° C. | 1.1 | 6.0 | 7.0 |
| 500° C. | 65 | 72 | 77 |
| 600° C. | 84 | 89 | 93 |

It is apparent from Table 8 that the results of Example 11, in which the catalyst has a greater pore volume formed by pores of not greater than 60 Å and a greater pore volume formed by pores of not greater than 80 Å while having a smaller total pore volume and a smaller surface area as compared with the catalyst of Examples 9 or 10, show accelerated oxidation of propane and higher efficiency of $NO_x$ reduction at low temperatures. These results lend confirmation to the fact that a volume of pores of not greater than 60 Å and that of pores of not greater than 80 Å are important factors ruling the $NO_x$ reduction efficiency of an alumina catalyst.

EXAMPLE 12

Twenty-five milliliters of a 1344 g/l aqueous solution of aluminum sulfate was diluted with 3000 ml of ion-exchanged water. The solution was mixed with 175 ml of a 197 g/l aqueous solution of sodium aluminate, and the mixed solution was heated to 90° C. with stirring.

A 134 g/l aluminum sulfate aqueous solution and a 197 g/l sodium aluminate aqueous solution were poured into the mixed solution at a rate of 4.83 ml/min and 3.33 ml/min, respectively. After 180 minutes from the start of pouring, a 500 ml portion of the mixture was withdrawn and filtered to collect a gel product, which was then thoroughly washed with ion-exchanged water, dried at 100° C. for one day, and calcined in an air flow at 600° C. for 3 hours to prepare an alumina catalyst.

NO removal from an NO-containing helium gas was carried out in the same manner as in Example 9, except for using the above-prepared alumina catalyst. The results obtained are shown in Table 9 together with the physical properties of the alumina catalyst.

Comparative Example 10

NO removal from an NO-containing helium gas was carried out in the same manner as in Example 9, except for using an alumina catalyst having characteristics shown in Table 9 ("Alumina KHS-46" calcined at 700° C.). The results obtained are shown in Table 9.

TABLE 9

|  | Example 12 | Compar. Example 10 |
|---|---|---|
| Alumina Catalyst: | | |
| Impurities (wt %) | Na: 0.03 | Ca: 0.01 |
| Volume of pores not greater than 60 Å ($cm^3 \cdot g^{-1}$) | 0.088 | 0.048 |
| Volume of pores not greater than 80 Å ($cm^3 \cdot g^{-1}$) | 0.132 | 0.190 |
| Total pore volume ($cm^3 \cdot g^{-1}$) | 0.496 | 0.529 |
| Surface area ($m^2 \cdot g^{-1}$) | 193 | 155 |
| Rate of NO Removal (%): Reaction temperature: | | |
| 400° C. | 12 | 10 |
| 500° C. | 80 | 46 |
| 600° C. | 49 | 54 |
| Conversion to $CO_x$ (%): Reaction temperature: | | |
| 400° C. | 5.0 | 2.2 |
| 500° C. | 71 | 25 |
| 600° C. | 88 | 77 |

As can be seen from Table 9, the alumina catalyst of Example 12, though having a smaller volume of pores of not greater than 80 Å than that of the catalyst of Comparative Example 10, exhibits a higher rate of NO reduction removal and a higher rate of propane oxidation. This is because the volume of pores of not greater than 60 Å of the former catalyst is so increased that the oxidation of propane is accelerated even in a low temperature region and reduction of NO also proceeds.

EXAMPLE 13

Application to Exhaust from Diesel Engine

The catalytic activity of the alumina catalyst prepared in Example 12 and molded into a honeycomb structure was tested in application to actual exhaust from a diesel engine in the same manner as in Example 7.

The exhaust before contact with the catalyst layer was found to contain about 500 ppm of $NO_x$, about 350 ppm of CO, about 4% of $CO_2$, about 500 ppm of THC, about 80 ppm of $SO_x$, about 16% of $O_2$, and about 6% of $H_2O$, in average.

The results obtained are shown in Table 10 below.

TABLE 10

| Elapsed Time (hours) | Reducing Agent (methanol) | |
|---|---|---|
| | 1000 ppm | 3000 ppm |
| 26 | 40 | |
| 99 | 35 | |
| 123 | 35 | |
| 261 | | 77 |
| 265 | 34 | |
| 357 | | 75 |
| 432 | 34 | |
| 502 | 32 | |
| 624 | | 73 |
| 790 | 33 | |
| 865 | | 72 |
| 934 | 32 | |
| 1012 | 34 | |
| 1342 | 32 | |

As is obvious from the results in Table 10, the alumina catalyst according to the present invention is capable of efficiently removing $NO_x$ from actual exhaust from a diesel engine containing about 6% of steam and about 80 ppm of $SO_x$ for as long a period of time as 1300 hours or more without undergoing no substantial reduction in performance.

EXAMPLE 14

In 35 g distilled water was dissolved 0.735 g of stannic chloride pentahydrate ($SnCl_4 \cdot 5H_2O$), and the aqueous solution was impregnated into 50 g of alumina ("Alumina N612N"), followed by allowing to stand for one day. The impregnated alumina was dried in an evaporator at 100° C. under reduced pressure and calcined in an air flow at 600° C. for 3 hours to prepare a tin-containing alumina catalyst. The tin content in the catalyst was 0.5% by weight based on alumina.

Helium gas containing about 1,000 ppm of nitrogen monoxide, about 10% of oxygen, about 8% by volume of steam, and about 1,000 ppm of propylene was made to flow in a normal pressure flow reactor packed with 0.4 g of the above-prepared tin-containing alumina catalyst at a rate of 120 ml/min and at a varied temperature as shown in Table 11 below. The resulting reaction gas was analyzed by gas chromatography, and from the $N_2$ yield was calculated a rate of NO reduction removal. The results obtained are shown in Table 11 together with the physical properties of the alumina catalyst.

Comparative Example 11

A tin-containing alumina catalyst was prepared in the same manner as in Example 14, except for replacing "Alumina N612N" with "Alumina KHA-46".

NO removal from an NO-containing helium gas was carried out in the same manner as in Example 14, except for using the above-prepared catalyst. The results obtained are shown in Table 11.

TABLE 11

|  | Example 14 | Compar. Example 11 |
|---|---|---|
| Alumina Catalyst: | | |
| Carrier | N612N | KHA-46 |
| Tin content | 0.5 wt % | 0.5 wt % |
| Impurities (wt %) | Ca: 0.02 | Na: 0.13 |
| | | Ca: 0.04 |
| Volume of pores not greater than | 0.28 | 0.29 |

TABLE 11-continued

|  | Example 14 | Compar. Example 11 |
|---|---|---|
| 80 Å ($cm^3 \cdot g^{-1}$) | | |
| Total pore volume ($cm^3 \cdot g^{-1}$) | 0.49 | 0.47 |
| Surface area ($m^2 \cdot g^{-1}$) | 174 | 160 |
| Rate of NO Removal (%): | | |
| Reaction temperature: | | |
| 600° C. | 26 | 16 |
| 500° C. | 48 | 40 |
| 400° C. | 57 | 48 |
| 300° C. | 22 | 9 |

As can be seen from Table 11, the tin-containing alumina catalyst of Comparative Example 11 having a high content of an alkali metal and/or an alkaline earth metal as impurities and a smaller total pore volume than the value specified in requirement II shows an obviously reduced NO reduction efficiency as compared with the high purity tin-containing alumina catalyst of Example 14.

EXAMPLE 15

A tin-containing alumina catalyst was prepared in the same manner as in Example 14, except for replacing "Alumina N612N" with "NK-346".

NO removal was carried out in the same manner as in Example 14, except for using the above-prepared catalyst. The results obtained are shown in Table 12 together with the physical properties of the catalyst.

EXAMPLE 16

A tin-containing alumina catalyst was prepared in the same manner as in Example 14, except for replacing "Alumina N612N" with "Neobead GB-45".

NO removal was carried out in the same manner as in Example 14, except for using the above-prepared catalyst. The results obtained are shown in Table 12 together with the physical properties of the catalyst.

EXAMPLE 17

A tin-containing alumina catalyst was prepared in the same manner as in Example 14, except for replacing "Alumina N612N" with "KHS-46".

NO removal was carried out in the same manner as in Example 14, except for using the above-prepared catalyst. The results obtained are shown in Table 12 together with the physical properties of the catalyst.

TABLE 12

|  | Example 15 | Example 16 | Example 17 |
|---|---|---|---|
| Alumina Catalyst: | | | |
| Carrier | NK-346 | GB-45 | KHS-46 |
| Impurities (wt %) | Na: 0.04 Ca: 0.02 | Mg: 0.01 Ca: 0.01 | Ca: 0.01 |
| Volume of pores not greater than 80 Å ($cm^3 \cdot g^{-1}$) | 0.41 | 0.33 | 0.20 |
| Total Pore volume ($cm^3 \cdot g^{-1}$) | 0.56 | 0.54 | 0.53 |
| Surface area ($m^2 \cdot g^{-1}$) | 236 | 188 | 159 |

TABLE 12-continued

|  | Example 15 | Example 16 | Example 17 |
|---|---|---|---|
| Rate of NO Removal (%): | | | |
| Reaction temperature: | | | |
| 600° C. | 20 | 25 | 8 |
| 500° C. | 48 | 55 | 33 |
| 400° C. | 60 | 60 | 30 |
| 300° C. | 32 | 31 | 4 |

As is apparent from Table 12, the alumina catalysts of Examples 15 and 16 each having a larger pore volume of pores not greater than 80 Å and a larger total pore volume than those of Example 17 each exhibit more satisfactory performance in $NO_x$ removal than the latter catalyst.

EXAMPLE 18

NO removal was carried out in the same manner as in Example 14, except for replacing propylene as a reducing agent with about 2,000 ppm of methanol. The results obtained are shown in Table 13.

Comparative Example 12

A tin-containing alumina catalyst was prepared in the same manner as in Example 14, except for replacing "Alumina N612N" with "SAH-21".

NO removal was carried out in the same manner as in Example 18, except for using the above-prepared catalyst. The results obtained are shown in Table 13 together with the physical properties of the catalyst.

This Example shows a comparative case where an alumina catalyst which does not satisfy requirements I and II exhibits reduced activities even if tin is incorporated thereinto.

TABLE 13

|  | Example 18 | Compar. Example 12 |
|---|---|---|
| Alumina Catalyst: | | |
| Carrier | N612N | SAH-21 |
| Tin content (wt %) | 0.5 | 0.5 |
| Impurities (wt %) | Ca: 0.02 | Na: 0.13 Mg: 1.2 Ca: 0.04 |
| Volume of pores not greater than 80 Å ($cm^3 \cdot g^{-1}$) | 0.28 | 0.23 |
| Total pore volume ($cm^3 \cdot g^{-1}$) | 0.49 | 0.47 |
| Surface area ($m^2 \cdot g^{-1}$) | 174 | 164 |
| Rate of NO Removal (%): | | |
| Reaction temperature: | | |
| 600° C. | 20 | 18 |
| 500° C. | 64 | 47 |
| 400° C. | 99 | 57 |
| 300° C. | 84 | 12 |

As can be seen from Table 14, the tin-containing alumina catalyst of Example 18 which satisfies requirements I and II attains a high rate of NO reduction removal over a broad temperature range in a reaction system containing methanol as an oxygen-containing organic compound as compared with the catalyst of Comparative Example 12.

EXAMPLE 19

In 350 g of distilled water was dissolved 14.7 g of stannic chloride pentahydrate ($SnCl_4 \cdot 5H_2O$), and the aqueous solution was impregnated into 500 g of alumina ("Alumina Neobead GB-45"), followed by allowing to stand for one day. The impregnated alumina was dried in an evaporator at 100° C. under reduced pressure and calcined in an air flow at 600° C. for 3 hours to prepare a tin-containing alumina catalyst. The tin content in the catalyst was 1% by weight based on alumina.

The catalytic activity of the above-prepared tin-containing alumina catalyst (120 ml) was tested in application to actual exhaust from a diesel engine in the same manner as in Example 7, except for using about 2,000 ppm of methanol as a reducing agent and the reaction was carried out at 350° C. The space velocity of the exhaust was kept at 10,000 $hr^{-1}$ in principle.

The exhaust before contact with the catalyst layer was found to contain about 500 ppm of $NO_x$, about 350 ppm of CO, about 4% of $CO_2$, about 500 ppm of THC, about 90 ppm of $SO_x$, about 16% of $O_2$, and about 6% by volume of $H_2O$, in average.

TABLE 14

| Elapsed Time (hrs) | Rate of NO Removal (%) |
| --- | --- |
| 5 | 89 |
| 15 | 84 |
| 40 | 82 |
| 65 | 79 |
| 80 | 78 |
| 100 | 78 |
| 130 | 79 |
| 180 | 77 |
| 200 | 76 |
| 250 | 77 |

The results in Table 14 prove that the tin-containing alumina catalyst according to the present invention is capable of efficiently removing $NO_x$ from actual exhaust from a diesel engine containing about 6% by volume of steam and about 90 ppm of $SO_x$ at a low temperature without undergoing any substantial reduction in preformance with time.

EXAMPLE 20

In 7 of distilled water was dissolved 0.147 g of stannic chloride pentahydrate ($SnCl_4 \cdot 5H_2O$), and the aqueous solution was impregnated into 10 g of alumina ("Alumina N611"), followed by allowing to stand for one day. The impregnated alumina was dried in an evaporator at 100° C. under reduced pressure and at 600° C. for 3 hours to prepare a tin-containing alumina catalyst. The tin content in the catalyst was 0.5% by weight based on alumina.

Helium gas containing 1,000 ppm of nitrogen monoxide, 10% of oxygen, 1,000 ppm of methanol, and 8% of steam was made to flow in a normal pressure flow reactor packed with 0.4 g of the above-prepared alumina catalyst at a contact time of 0.2 $g \cdot s \cdot cm^{-3}$ and at a varied temperature as shown in Table 15 below. The resulting reaction gas was analyzed by gas chromatography to determine $N_2$, $N_2O$, CO, $CO_2$, etc., and from the $N_2$ yield was calculated a rate of NO reduction removal. The results obtained are shown in Table 15 together with the physical properties of the alumina carrier.

TABLE 15

| | Example 20 |
| --- | --- |
| Alumina Carrier: | |
| Impurities (wt %) | Not Detected |
| Volume of pores not greater than 60 Å ($cm^3 \cdot g^{-1}$) | 0.083 |
| Volume of pores not greater than 80 Å ($cm^3 \cdot g^{-1}$) | 0.238 |
| Total pore volume ($cm^3 \cdot g^{-1}$) | 0.488 |
| Surface area ($m^2 \cdot g^{-1}$) | 168 |
| Rate of NO Removal (%): Reaction temperature: | |
| 500° C. | 10 |
| 400° C. | 33 |
| 300° C. | 63 |
| Conversion to $CO_x$ (%): Reaction temperature: | |
| 500° C. | 100 |
| 400° C. | 100 |
| 300° C. | 87 |

The results in Table 15 prove that the tin-containing alumina catalyst of the present invention having a very low alkali and/or alkaline earth metal content, a volume of pores of not greater than 60 Å of not less than 0.06 $cm^3 \cdot g^{-1}$, and a volume of pores of not greater than 80 Å of not less than 0.1 $cm^3 \cdot g^{-1}$ is capable of reducing and removing $NO_x$ with very high efficiency even in an atmosphere containing steam.

Comparative Examples 13 To 17

In 35 g of ion-exchanged water was dissolved each of 0.93 g of sodium nitrate, 0.66 g of potassium nitrate, 1.5 g of calcium nitrate tetrahydrate, 2.7 g of magnesium nitrate hexahydrate, and 0.49 g of barium nitrate. Fifty grams of alumina ("Alumina N611") was impregnated with the resulting aqueous solution, dried at 100° C. for one day, and calcined in an air flow at 600° C. for 3 hours.

The thus prepared alumina had an Na content of 0.51% by weight, a K content of 0.55% by weight, a Ca content of 0.52% by weight, an Mg content of 0.56% by weight, or a Ba content of 0.52% by weight.

A tin-containing alumina catalyst was prepared in the same manner as in Example 20, except for using, as a carrier, the above-prepared alumina containing an alkali metal or an alkaline earth metal as an impurity, and NO removal from an NO-containing helium gas was carried out in the same manner as in Example 20 by using each of the thus prepared tin-containing alumina catalysts. The results obtained are shown in Table 16 below.

TABLE 16

| | Compar. Example 13 | Compar. Example 14 | Compar. Example 15 | Compar. Example 16 | Compar. Example 17 |
| --- | --- | --- | --- | --- | --- |
| Tin-Containing Alumina Catalyst: | | | | | |
| Impurities (wt %) | Na: 0.51 | K: 0.55 | Ca: 0.52 | Mg: 0.56 | Ba: 0.52 |
| Volume of | 0.083 | 0.083 | 0.083 | 0.083 | 0.083 |

TABLE 16-continued

| | Compar. Example 13 | Compar. Example 14 | Compar. Example 15 | Compar. Example 16 | Compar. Example 17 |
|---|---|---|---|---|---|
| pores not greater than 60 Å ($cm^3 \cdot g^{-1}$) | | | | | |
| Volume of pores not greater than 80 Å ($cm^3 \cdot g^{-1}$) | 0.238 | 0.238 | 0.238 | 0.238 | 0.238 |
| Total pore volume ($cm^3 \cdot g^{-1}$) | 0.488 | 0.488 | 0.488 | 0.488 | 0.488 |
| Surface area ($m^2 \cdot g^{-1}$) | 168 | 168 | 168 | 168 | 168 |
| Rate of NO Removal (%): | | | | | |
| Reaction Temperature: | | | | | |
| 500° C. | 0 | 0 | 0 | 0 | 0 |
| 450° C. | 1.1 | 1.6 | 2.8 | 7.8 | 6.6 |
| 400° C. | 9.4 | 11 | 12 | 29 | 20 |
| 350° C. | 15 | 18 | 29 | 44 | 34 |
| 300° C. | 18 | 22 | 34 | 42 | 51 |

Table 16 reveals that tin-containing alumina catalysts containing 0.5% by weight or more of an alkali metal and/or an alkaline earth metal suffer from marked reduction in NO reduction efficiency as compared with the tin-containing alumina catalyst of Example 20 which contains substantially no impurity. The degree of reduction in activity is especially conspicuous with tin-containing alumina catalysts containing an alkali metal, e.g., Na or K.

EXAMPLES 21 TO 23

Twenty-five milliliters of a 1344 g/l aqueous solution of aluminum sulfate was diluted with 3000 ml of ion-exchanged water. The solution was mixed with 175 ml of a 197 g/l aqueous solution of sodium aluminate, and the mixed solution was heated to 90° C. with stirring.

A 134 g/l aluminum sulfate aqueous solution and a 197 g/l sodium aluminate aqueous solution were poured into the mixed solution at a rate of 4.83 ml/min and 3.33 ml/min, respectively. After 120 minutes, 240 minutes, and 270 minutes from the start of pouring, a 500 ml portion of the mixture was withdrawn and filtered to collect a gel product, which was then thoroughly washed with ion-exchanged water, dried at 100° C. for one day, and calcined in an air flow at 600° C. for 3 hours.

A tin-containing alumina catalyst was prepared in the same manner as in Example 20, except for using, as a carrier, the alumina, and NO removal from an NO-containing helium gas was carried out in the same manner as in Example 20, except for using the resulting tin-containing alumina catalyst, replacing methanol as a reducing agent with about 1,000 ppm of propylene, and steam was excluded from the helium gas to be treated. The results obtained are shown in Table 17 below together with the physical properties of the alumina carrier.

TABLE 17

| | Example 21 | Example 22 | Example 23 |
|---|---|---|---|
| Alumina Carrier: | | | |
| Impurities (wt %) | Na: 0.03 | Na: 0.04 | Na: 0.04 |
| Volume of pores not greater than 60 Å ($cm^3 \cdot g^{-1}$) | 0.074 | 0.103 | 0.109 |
| Volume of pores not greater than 80 Å ($cm^3 \cdot g^{-1}$) | 0.132 | 0.133 | 0.139 |
| Total pore volume ($cm^3 \cdot g^{-1}$) | 0.516 | 0.416 | 0.393 |
| Surface area ($m^2 \cdot g^{-1}$) | 207 | 193 | 187 |
| Rate of NO Removal (%): | | | |
| Reaction temperature: | | | |
| 400° C. | 60 | 65 | 73 |
| 500° C. | 55 | 56 | 54 |
| 600° C. | 25 | 22 | 18 |
| Conversion to $CO_x$ (%): | | | |
| Reaction temperature: | | | |
| 400° C. | 66 | 72 | 81 |
| 500° C. | 100 | 100 | 100 |
| 600° C. | 100 | 100 | 100 |

It is apparent from Table 17 that the results of Example 22, in which the catalyst has a greater pore volume formed by pores of not greater than 60 Å and a greater pore volume formed by pores of not greater than 80 Å though having a smaller total pore volume and a smaller surface area as compared with the catalyst of Examples 20 or 21, reveal accelerated oxidation of propylene and higher efficiency of $NO_x$ reduction at low temperatures. These results lend confirmation to the fact that a volume of pores of not greater than 60 Å and that of pores of not greater than 80 Å are important factors ruling the $NO_x$ reduction efficiency of a tin-containing alumina catalyst.

EXAMPLE 24

Twenty-five milliliters of a 1344 g/l aqueous solution of aluminum sulfate was diluted with 3000 ml of ion-exchanged water. The solution was mixed with 175 ml of a 197 g/l aqueous solution of sodium aluminate, and the mixed solution was heated to 90° C. with stirring.

A 134 g/l aluminum sulfate aqueous solution and a 197 g/l sodium aluminate aqueous solution were poured into the mixed solution at a rate of 4.83 ml/min and 3.33 ml/min, respectively. A 500 ml portion of the mixture was withdrawn after 180 minutes from the start of pouring and filtered to collect a gel product, which was then thoroughly washed with ion-exchanged water, dried at 100° C. for one day, and calcined in an air flow at 600° C. for 3 hours.

A tin-containing alumina catalyst (tin content: 0.5% by weight) was prepared in the same manner as in Example 20, except for using, as a carrier, the above-prepared alumina, and NO removal from an NO-containing helium gas was carried out in the same manner as in Example 21, except for using the resulting tin-containing alumina catalyst. The results obtained are shown in Table 18 below together with the physical properties of the alumina carrier.

Comparative Example 18

A tin-containing alumina catalyst (tin content: 0.5% by weight) was prepared in the same manner as in Example 20, except for using, as a carrier, "Alumina KHS-46" (calcined at 700° C.), and NO removal from an NO-containing helium gas was carried out in the same manner as in Example 21, except for using the resulting tin-containing alumina catalyst. The results obtained are shown in Table 18 together with the characteristics of the alumina carrier.

TABLE 18

|  | Example 24 | Compar. Example 18 |
|---|---|---|
| Alumina Carrier: |  |  |
| Impurities (wt %) | Na: 0.03 | Ca: 0.01 |
| Volume of pores not greater than 60 Å ($cm^3 \cdot g^{-1}$) | 0.088 | 0.048 |
| Volume of pores not greater than 80 Å ($cm^3 \cdot g^{-1}$) | 0.132 | 0.190 |
| Total pore volume ($cm^3 \cdot g^{-1}$) | 0.496 | 0.529 |
| Surface area ($m^2 \cdot g^{-1}$) | 193 | 155 |
| Rate of NO Removal (%): Reaction temperature: |  |  |
| 400° C. | 62 | 26 |
| 500° C. | 58 | 35 |
| 600° C. | 20 | 11 |
| Conversion to $CO_x$ (%): Reaction temperature: |  |  |
| 400° C. | 69 | 43 |
| 500° C. | 100 | 88 |
| 600° C. | 100 | 100 |

As can be seen from Table 18, the alumina catalyst of Example 24, while having a smaller volume of pores of not greater than 80 Å than that of the catalyst of Comparative Example 18, exhibits a higher rate of NO reduction removal and a higher rate of propylene oxidation. This is because the volume of pores of not greater than 60 Å of the former catalyst is so increased that concentration of NO is accelerated thereby accelerating oxidation of propylene even in a low temperature region and simultaneously inducing reduction of NO.

While the invention has been described in detail and with reference to specific examples thereof, it will be apparent to one skilled in the art that various changes and modifications can be made therein without departing from the spirit and scope thereof.

What is claimed is:

1. A process for removing nitrogen oxide from exhaust, comprising contacting exhaust containing nitrogen oxide with an alumina catalyst containing not more than 0.5% by weight of an alkali metal and/or an alkaline earth metal and having a pore volume of pores of not greater than 60 Å of from 0.06 to 0.2 $cm^3 \cdot g^{-1}$ and a pore volume of pores of not greater than 80 Å of not less than 0.1 $cm^3 \cdot g^{-1}$ and less than 0.26 $cm^3 \cdot g^{-1}$ in an oxidative atmosphere containing excess oxygen provided by said exhaust in the presence of a hydrocarbon or an oxygen-containing organic compound, wherein said nitrogen oxide is removed from said exhaust by contacting said exhaust comprising said oxidative atmosphere containing excess oxygen, said hydrocarbon or said oxygen-containing compound and said exhaust containing nitrogen oxide with said catalyst, wherein the excess oxygen is present in an amount so as to provide an oxygen excess ratio of about 20% or more, wherein said oxygen excess is over the theoretical amount necessary for completely oxidizing carbon monoxide, hydrogen, and hydrocarbons or oxygen-containing organic compounds which are present in said exhaust, wherein said alumina catalyst contains from 0.01 to 30% by weight of tin based on alumina.

2. A process as claimed in claim 1, wherein said alumina catalyst contains from 0.1 to 10% by weight of tin based on alumina.

3. A process as claimed in claim 2, wherein said oxygen-containing organic compound is methanol.

4. A process as claimed in claim 1, wherein said oxygen-containing organic compound is methanol.

5. A process for removing nitrogen oxide from exhaust, comprising contacting exhaust containing nitrogen oxide with an alumina catalyst containing not more than 0.5% by weight of an alkali metal and/or an alkaline earth metal and having a pore volume of from 0.48 to 1.2 $cm^3 \cdot g^{-1}$ with 0.26 to 0.6 $cm^3 \cdot g^{-1}$ of the total pore volume being formed of pores of not greater than 80 Å in an oxidative atmosphere containing excess oxygen provided by said exhaust in the presence of a hydrocarbon or an oxygen-containing organic compound, wherein said nitrogen oxide is removed from said exhaust by contacting said exhaust comprising said oxidative atmosphere containing excess oxygen, said hydrocarbon or said oxygen-containing compound and said exhaust containing nitrogen oxide, with said catalyst, wherein the excess oxygen is present in an amount so as to provide an oxygen excess ratio of about 20% or more, wherein said oxygen excess is over the theoretical amount necessary for completely oxidizing carbon monoxide, hydrogen, and hydrocarbons or oxygen-containing organic compounds which are present in said exhaust, wherein said alumina catalyst contains from 0.01 to 30% by weight of tin based on alumina.

6. A process as claimed in claim 5, wherein said alumina catalyst contains from 0.1 to 10% by weight of tin based on alumina.

7. A process as claimed in claim 6, wherein said oxygen-containing organic compound is methanol.

8. A process as claimed in claim 5, wherein said oxygen-containing organic compound is methanol.

* * * * *